US012673288B2

(12) United States Patent
Tuma et al.

(10) Patent No.: US 12,673,288 B2
(45) Date of Patent: Jul. 7, 2026

(54) ADSORBENT FILTER ASSEMBLY

(71) Applicant: Donaldson Company, Inc.,
Bloomington, MN (US)

(72) Inventors: Daniel L. Tuma, Saint Paul, MN (US);
Scott Keller, Savage, MN (US)

(73) Assignee: Donaldson Company, Inc.,
Bloomington, MN (US)

( * ) Notice: Subject to any disclaimer, the term of this
patent is extended or adjusted under 35
U.S.C. 154(b) by 485 days.

(21) Appl. No.: 18/144,706

(22) Filed: May 8, 2023

(65) Prior Publication Data

US 2023/0356128 A1    Nov. 9, 2023

Related U.S. Application Data

(60) Provisional application No. 63/339,668, filed on May
9, 2022.

(51) Int. Cl.
B01D 53/04       (2006.01)
B01D 46/00       (2022.01)
(Continued)

(52) U.S. Cl.
CPC ..... B01D 46/0036 (2013.01); B01D 46/0001
(2013.01); B01D 46/543 (2013.01);
(Continued)

(58) Field of Classification Search
None
See application file for complete search history.

(56) References Cited

U.S. PATENT DOCUMENTS

| | | | |
|---|---|---|---|
| 4,113,627 A | 9/1978 | Leason | |
| 4,826,598 A | 5/1989 | Cain | |

(Continued)

FOREIGN PATENT DOCUMENTS

| | | | | | |
|---|---|---|---|---|---|
| KR | 20160076698 A | * | 7/2016 | .......... | B01D 53/266 |
| KR | 101856905 B1 | * | 6/2018 | .......... | B01D 53/263 |

(Continued)

OTHER PUBLICATIONS

KR101856905B1_ENG (Espacenet machine translation of Park)
(Year: 2018).*

(Continued)

*Primary Examiner* — Gabriel E Gitman
(74) *Attorney, Agent, or Firm* — Mueting Raasch Group

(57) ABSTRACT

A filter assembly has a housing. The housing has an inner
body and an outer body surrounding at least a portion of the
inner body. The inner body has a base extending in a lateral
direction and a first sidewall extending axially outward from
the base. The inner body defines a cavity. The first sidewall
defines a perimetric surface around the cavity. A first filter
media extends across the perimetric surface and across the
cavity. An adsorbent is disposed in the cavity. The outer
body has a second sidewall laterally outward from and
surrounding the first sidewall. The second sidewall spans at
least 50% of the axial length of the first sidewall. The outer
body has a first axial end and a second axial end and a
retainer portion extending laterally inward from the first
axial end. The retainer portion is positioned axially outward
from the first filter media.

18 Claims, 9 Drawing Sheets

(51) Int. Cl.
    *B01D 46/54*       (2006.01)
    *B01D 53/26*       (2006.01)
    *B01J 20/28*       (2006.01)

(52) U.S. Cl.
    CPC ....... *B01D 53/0415* (2013.01); *B01D 53/261*
    (2013.01); *B01J 20/2805* (2013.01); *B01D*
    *2257/708* (2013.01); *B01D 2257/80* (2013.01);
    *B01D 2279/45* (2013.01); *B01J 20/28052*
    (2013.01)

(56)           References Cited

U.S. PATENT DOCUMENTS

| | | | |
|---|---|---|---|
| 4,863,499 | A | 9/1989 | Osendorf |
| 5,030,260 | A | 7/1991 | Beck et al. |
| 5,556,541 | A | 9/1996 | Ruschke |
| 5,766,469 | A | 6/1998 | Boast et al. |
| 6,214,070 | B1 | 4/2001 | Crowder et al. |
| 6,403,008 | B1 | 6/2002 | Schann |
| 6,475,270 | B1 | 11/2002 | Graeve |
| 6,475,279 | B1 | 11/2002 | Akimoto |
| 6,722,508 | B2 | 4/2004 | Parker et al. |
| 6,779,669 | B2 | 8/2004 | Schann |
| 6,986,571 | B2 | 1/2006 | Dudenhoefer et al. |
| 7,396,376 | B2 | 7/2008 | Schrage et al. |
| 7,658,886 | B2 | 2/2010 | Olivier et al. |
| 7,998,349 | B2 | 8/2011 | Rautio |
| 8,241,383 | B2 | 8/2012 | Schrage et al. |
| 8,246,883 | B2 | 8/2012 | Bassett et al. |
| 8,377,298 | B2 | 2/2013 | Stolarik et al. |
| 9,302,795 | B1 | 4/2016 | Beatty et al. |
| 10,134,447 | B2 | 11/2018 | Beatty et al. |
| 2015/0336047 | A1* | 11/2015 | Billiet ................. B01J 20/2803 95/91 |
| 2017/0368492 | A1* | 12/2017 | Willert .............. B01D 53/0415 |

FOREIGN PATENT DOCUMENTS

| | | | |
|---|---|---|---|
| WO | 2014066683 | A1 | 5/2014 |
| WO | 2021035185 | A1 | 2/2021 |
| WO | 2023219960 | A1 | 11/2023 |

OTHER PUBLICATIONS

KR20160076698A_ENG (Espacenet machine translation of Chung) (Year: 2016).*

International Search Report and Written Opinion in PCT/US2023/021381, mailed Sep. 1, 2023, 13 pages.

\* cited by examiner

600

650 — Form the inner body

652 — Deposit the adsorbent in the cavity

654 — Dispose the first filter media across the perimetric surface and the cavity 656 — Couple the outer body to the inner body

ADSORBENT FILTER ASSEMBLY

RELATED APPLICATIONS

This application claims the benefit of U.S. Provisional Application No. 63/339,668, filed 9 May 2022, the disclosure of which is incorporated by reference herein in its entirety.

TECHNOLOGICAL FIELD

The present disclosure is generally related to an adsorbent filter assembly. More particularly, the present disclosure is related to an adsorbent filter assembly for an electronics enclosure.

BACKGROUND

Various situations require conditions that allow the ability to control the amount of moisture in the air. For example, applications within electronics enclosures, such as disk drives, that contain sensitive electronic components and equipment often require that moisture levels within the enclosure be maintained and regulated to operate consistently. An improper level of moisture can interfere with mechanical and electrical operations of the components and equipment.

It can also be desirable to eliminate chemical contaminants within the enclosed environment such as hydrocarbons, siloxane, silanes, organic acids and others. Chemical contaminants can reduce the efficiency and longevity of the components within the electronics enclosure. Such chemical contaminants can enter the enclosure from external sources or be generated within the enclosure during manufacturing or use. In the case of disk drives, the contaminants can gradually damage the drive, resulting in deterioration of drive performance and even complete failure of the drive. Consequently, disk drives typically have one or more filters capable of removing moisture and chemical contaminants in the air within the electronics enclosure, such as adsorbent filters. Disk drives may also have gases such as helium disposed in the electronics enclosure, which may help further protect the drive. As such, the term "air" as used herein encompasses any gaseous chemical compounds such as those that may be within a disk drive environment.

An adsorbent filter can be used within the enclosure to remove humidity and chemical contaminants from air within the enclosure. An adsorbent filter can contain various types of adsorbent materials such as silica gel, activated carbon, molecular sieve and the like. The adsorbent filter can produce adsorbent filter particulate, which can contribute to the contaminants that can enter the enclosure.

SUMMARY

Some embodiments of the technology disclosed herein relate to a filter assembly having a housing. The housing has an inner body and an outer body coupled to the inner body. The inner body has a base extending in a lateral direction and a first sidewall extending axially outward from the base by an axial length. The inner body defines a cavity. The first sidewall defines a perimetric surface around the cavity. The filter assembly also includes a first filter media extending across the perimetric surface and across the cavity. The filter assembly also includes an adsorbent disposed in the cavity. The outer body includes a second sidewall laterally outward from the first sidewall and surrounding the first sidewall.

The second sidewall spans at least 50% of the axial length of the first sidewall. The outer body has a first axial end and a second axial end. The outer body also includes a retainer portion extending laterally inward from the first axial end of the second sidewall. The retainer portion is positioned axially outward from the first filter media.

Additionally or alternatively, the retainer portion is a second filter media coupled to the second sidewall and extending across the first filter media. Additionally or alternatively, the retainer portion is an inner rim defining a central opening. In such embodiments, the inner rim extends laterally across at least a portion of the perimetric surface.

Additionally or alternatively, an inner surface of the outer body is bonded to an outer surface of the inner body. Additionally or alternatively, the second axial end of the second sidewall is bonded to the base. Additionally or alternatively, the first filter media is bonded to the perimetric surface. Additionally or alternatively, the first filter media is bonded to the retainer portion.

Additionally or alternatively, the adsorbent is carbon. Additionally or alternatively, the first filter media is a microporous membrane. Additionally or alternatively, the inner body is constructed of an impermeable material. Additionally or alternatively, the inner body is rigid. Additionally or alternatively, the second sidewall is constructed of an impermeable material. Additionally or alternatively, the second sidewall is rigid. In some embodiments, the second sidewall is a coating on the first filter media and the inner body.

Additionally or alternatively, the filter assembly also includes an adhesive layer coupled to an outer surface of the base. Additionally or alternatively, the base defines a diffusion channel. Additionally or alternatively, the filter assembly has an intermediate body disposed between the inner body and the outer body. The intermediate body has a laterally extending surface where the base is positioned axially between the adsorbent and the laterally extending surface. An intermediate sidewall extends axially outward from the laterally extending surface by an axial length. The intermediate sidewall is positioned between the first sidewall and the second sidewall. Additionally or alternatively, the inner body is non-rigid. Additionally or alternatively, the intermediate body is rigid.

Additionally or alternatively, the second sidewall abuts the first sidewall along the length of the first sidewall. Additionally or alternatively, the second sidewall spans at least 75% of the axial length of the first sidewall. Additionally or alternatively, the second sidewall spans at least 85% of the axial length of the first sidewall. Additionally or alternatively, the second sidewall spans at least 90% of the axial length of the first sidewall. Additionally or alternatively, the second sidewall spans at least 95% of the axial length of the first sidewall. Additionally or alternatively, the second sidewall spans 100% of the axial length of the first sidewall.

Some embodiments of the technology disclosed herein relate to a method of forming a filter assembly as described according to any of the embodiments above. Such a method includes forming an inner body as disclosed above. Additionally or alternatively, the inner body has a base that extends in a lateral direction. Additionally or alternatively, the inner body has a first sidewall extending axially outward from the base by an axial length. Additionally or alternatively, the base and the first sidewall define a cavity. Additionally or alternatively, the first sidewall has a perimetric surface around the cavity. Additionally or alternatively, the method also includes depositing an adsorbent in the cavity.

Additionally or alternatively, the method also includes disposing a first filter media across the perimetric surface and the cavity. Additionally or alternatively, the method also includes coupling an outer body to the inner body. Additionally or alternatively, a second sidewall of the outer body is positioned laterally outward from the first sidewall and surrounds the first sidewall. Additionally or alternatively, the second sidewall spans at least 50% of the axial length of the first sidewall. Additionally or alternatively, the outer body has a first axial end and a second axial end. Additionally or alternatively, the outer body further includes a retainer portion extending laterally inward from the first axial end of the second sidewall. Additionally or alternatively, the retainer portion is positioned axially outward from the first filter media.

Additionally or alternatively, the method also includes depositing a second filter media across the first filter media. Additionally or alternatively, the method also includes coupling the second filter media to the second sidewall to define the retainer portion. Additionally or alternatively, the retainer portion is an inner rim defining a central opening. Additionally or alternatively, the inner rim extends laterally across at least a portion of the perimetric surface.

Additionally or alternatively, the method also includes bonding an inner surface of the outer body to an inner surface of the inner body. Additionally or alternatively, the method also includes bonding the second axial end of the second sidewall to the base. Additionally or alternatively, the method also includes bonding the first filter media to the perimetric surface. Additionally or alternatively, the method also includes bonding the first filter media to the retainer portion.

Additionally or alternatively, the adsorbent is carbon. Additionally or alternatively, the first filter media is a microporous membrane. Additionally or alternatively, the inner body is constructed of an impermeable material. Additionally or alternatively, the inner body is rigid. Additionally or alternatively, the second sidewall is constructed of an impermeable material. Additionally or alternatively, the second sidewall is rigid.

Additionally or alternatively, the method also includes overmolding the second sidewall onto the first filter media and the inner body. Additionally or alternatively, the method also includes coupling an adhesive layer to an outer surface of the base. Additionally or alternatively, the base defines a diffusion channel. Additionally or alternatively, the inner body is disposed in an intermediate body. The intermediate body has a laterally extending surface, where the base is positioned axially between the adsorbent and the laterally extending surface. An intermediate sidewall extends axially outward from the laterally extending surface by an axial length. The intermediate sidewall is positioned between the first sidewall and the second sidewall. Additionally or alternatively, the inner body is non-rigid. Additionally or alternatively, the intermediate body is rigid.

Additionally or alternatively, the second sidewall abuts the first sidewall along the length of the first sidewall. Additionally or alternatively, the second sidewall spans at least 75% of the axial length of the first sidewall. Additionally or alternatively, the second sidewall spans at least 85% of the axial length of the first sidewall. Additionally or alternatively, the second sidewall spans at least 90% of the axial length of the first sidewall. Additionally or alternatively, the second sidewall spans at least 95% of the axial length of the first sidewall. Additionally or alternatively, the second sidewall spans 100% of the axial length of the first sidewall.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawings.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Figure 1:
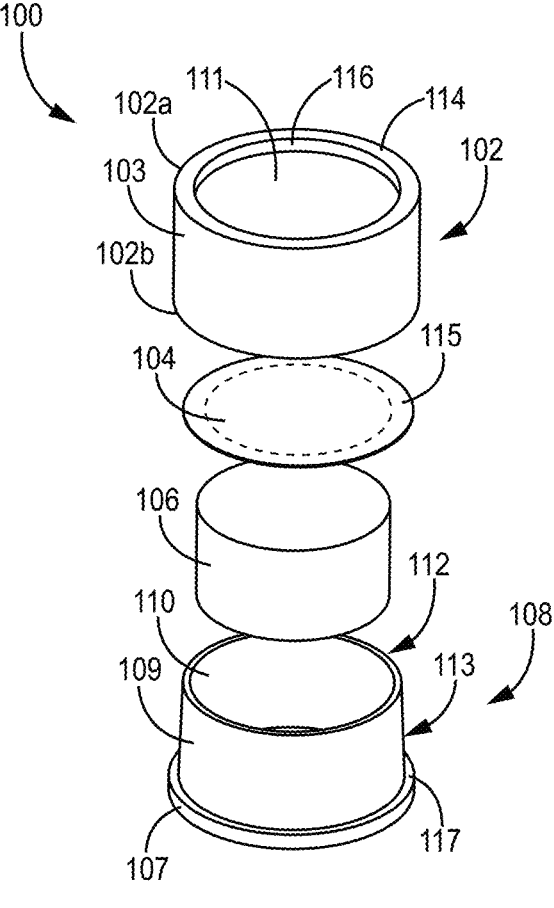
FIG. 1 is an exploded perspective view of an example adsorbent filter assembly consistent with various embodiments.
Figure 2A:
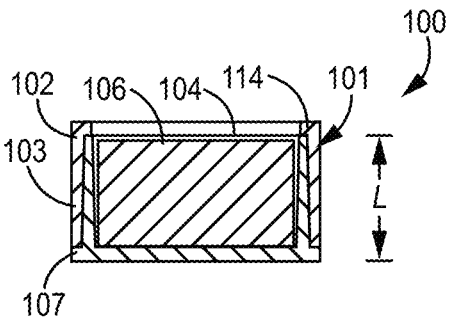
FIG. 2A is a cross-sectional view consistent with the example of FIG. 1.

Filter assemblies consistent with the technology disclosed herein can have a variety of different configurations. FIG. 1 depicts one example exploded view of an example filter assembly 100 and FIG. 2A depicts a cross-sectional view of the filter assembly 100 of FIG. 1.

The filter assembly 100 is configured to be disposed in an electronics enclosure. The filter assembly 100 is generally configured to remove humidity and other chemical contaminants from the electronics enclosure. The filter assembly 100 is disclosed that has an inner body 108, an outer body 102, a first filter media 104, and an adsorbent 106.

The housing 101 includes the inner body 108 and the outer body 102. Inner body 108 has a first sidewall 109. Outer body 102 has a second sidewall 103. The housing and each component thereof are discussed below, and any material or material properties discussed in terms of the housing 101 may apply to the components of the housing 101, such as the inner body 108 and the outer body 102. In some embodiments, the housing 101 is constructed of a material that is impermeable to air flow therethrough. By "impermeable to air flow" it is meant that the material forming the housing 101 is substantially resistant to air flow therethrough.

The housing 101 can have a variety of configurations while remaining consistent with the technology disclosed herein. In the current example embodiment, the housing 101 defines a portion of a cylinder defining the cavity 110. In some other embodiments, the housing 101 can define alternate shapes, however (e.g., a partial sphere, cube, cuboid, prismatic, pyramidal, cone, etc.). In some embodiments, such as the one currently depicted, the housing 101 does not define more than a single opening that accommodates fluid communication between the outside environment (for example, a disk drive enclosure) and the cavity 110. In various other embodiments, the housing 101 can define additional openings that accommodate fluid communication between the outside environment and the cavity 110.

The housing 101 can be constructed of a variety of materials and combinations of materials while remaining consistent with the technology disclosed herein. In some embodiments the housing 101 is rigid. The term "rigid" may be defined as a material whose shape is self-supporting under the force of gravity. A rigid configuration may advantageously facilitate placement of the filter assembly 100 in the environment in which it will be used, such as a disk drive. A rigid configuration may advantageously facilitate the addition of the adsorbent 106 to the cavity 110 during manufacture of the filter assembly 100. In some embodiments, the housing 101 is constructed of plastic or metal, or cured resin, as examples. In some embodiments, the housing 101 is constructed of a molded plastic. The housing 101 can be polycarbonate. The housing 101 can be nylon.

Figure 2B:
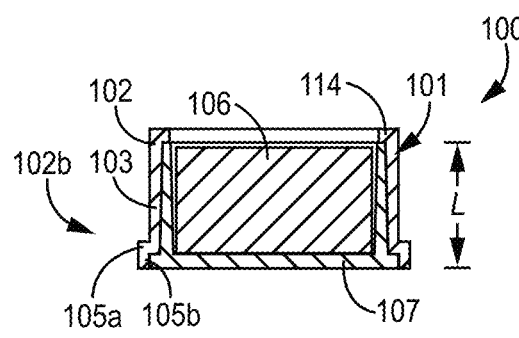
FIG. 2B is a cross-sectional view of an alternate example filter assembly to that depicted in FIG. 2A.

The inner body 108 has a first sidewall 109 with a perimetric surface 112. The inner body 108 can include a base 107 extending in a lateral direction. The lateral direction can be transverse to the axial direction. The inner body 108 can further include a first sidewall 109 extending axially outward in an axial direction from the base 107 by an axial length, L. The axial length L may be less than or equal to 35 mm, less than or equal to 30 mm, or less than or equal to 25 mm for example. The axial length L may be greater than or equal to 4 mm, greater than or equal to 6 mm, for example. For purposes of the present disclosure, the axial length L of the first sidewall 109 is the axial length of the outer surface of the inner body 108, which includes the thickness (in the axial direction) of the base, as illustrated in FIGS. 2A and 2B.

While not currently depicted, in some example embodiments, the base 107 can define a breather port and a diffusion channel, as discussed below with reference to other embodiments. The inner body 108 can define the cavity 110 bounded by the first sidewall 109 and the base 107. The first sidewall 109 can define the perimetric surface 112 around the cavity 110.

The perimetric surface 112 is generally configured to be coupled to the first filter media 104 such that the first filter media 104 extends across the cavity 110. The perimetric surface 112 can extend laterally. The perimetric surface 112 can surround the cavity 110. The perimetric surface 112 can be located at a distal end of the first sidewall 109 relative to the base 107 of the inner body 108. The term "distal" is used herein to refer to a component or a feature that is situated relatively distant to the base 107. The term "proximal" is used herein to refer to a component or feature that is situated relatively near to the base 107.

In some embodiments, such as the one currently depicted, the inner body 108 can include a single chamber within the cavity 110. In other exemplary embodiments, the inner body 108 can include a first chamber and a second chamber within the cavity 110. For example, the first chamber and the second chamber can abut one another within the cavity 110. The first sidewall 109 and the perimetric surface 112 can define the first and second chambers. In various embodiments, the first chamber and the second chamber can be separated from one another by a partition wall extending across the cavity. Such a configuration may advantageously allow more than one adsorbent to be placed within the filter assembly 100 while limiting physical or chemical interaction between the adsorbents.

The housing 101 (and in example embodiments, more specifically the inner body 108) and the first filter media 104 mutually define the cavity 110 between them. The first filter media 104 abuts the cavity 110 to allow fluid communication between the cavity 110 and the environment external to the filter assembly 100. In some embodiments, the first filter media 104 can be coupled to the inner body 108. The first filter media 104 can be coupled to the perimetric surface 112. In some embodiments, the first filter media 104 includes a perimeter region 115, which can be coupled to the perimetric surface 112. The first filter media 104 and the perimetric surface 112 can be coupled with adhesive, welds such as ultrasonic welds or heat welds, and the like.

The first filter media 104 is configured to accommodate fluid communication therethrough including water vapor and chemical contaminants. The first filter media 104 can be a variety of different materials and combinations of materials. The first filter media 104 can be vapor-permeable to allow vapors to pass into the filter assembly 100 for capture by the adsorbent 106. The first filter media 104 can be configured to obstruct the flow of liquid water therethrough. In some, but not all, embodiments the first filter media 104 is substantially impermeable to liquid water under normal operating conditions. The first filter media 104 can be a microporous membrane, where the term "microporous" is intended to mean that the membrane defines pores having an average pore diameter between 0.001 and 5.0 microns. The first filter media 104 can define pore sizes ranging from 0.05 to 5.0 microns, 0.2 to 4.0 microns, or 0.5 to 3.0 microns. In one example, the first filter media 104 has an average pore size of 1.5 microns. In one example, the first filter media 104 has a maximum pore size of 3.0 microns.

In some embodiments, the first filter media 104 can have a solidity of less than 50% and a porosity of greater than 50%. The first filter media 104 can have a plurality of nodes interconnected by fibrils. In a number of embodiments the first filter media 104 is an expanded polytetrafluoroethylene (PTFE) membrane. The first filter media 104 can additionally or alternatively be constructed of polyamide, polyethylene terephthalate, acrylic, polyethersulfone, and/or polyethylene, as other examples.

The first filter media 104 can be a laminate or composite that includes a microporous membrane, such as a PTFE layer, laminated to a woven or non-woven support layer. In some embodiments, the first filter media 104 can have a microporous membrane coupled to a scrim layer. In some embodiments, the first filter media 104 can have three layers, such as a microporous membrane layer that is positioned between two scrim layers. In some other embodiments, the first filter media 104 can have three layers, where a single scrim layer is laminated between two microporous membrane layers. The scrim layer is generally configured to increase the strength and/or stiffness of the membrane. In one embodiment the scrim layer is polyester. The scrim layer can also be other materials and combinations of materials such as, for example, PE, PET, and polypropylene. For example, a PTFE layer can be laminated to a non-woven layer of polyester. In some embodiments the first filter media 104 is a fibrous filter material with or without a supportive scrim layer.

The cavity 110 is configured to receive the adsorbent 106. The first filter media 104 is coupled to the inner body 108 across the cavity 110 to isolate the cavity, and therefore the adsorbent 106, from the environment outside of the filter assembly 100.

The adsorbent 106 is generally configured to adsorb chemical contaminants from the cavity 110. The adsorbent 106 is disposed between the first filter media 104 and the inner body 108. In example embodiments, the adsorbent 106 is generally configured to adsorb chemical contaminants from the outside environment which flow into the cavity 110. The adsorbent 106 can be a physisorbent or chemisorbent material, such as, for example, a desiccant (i.e., a material that adsorbs water or water vapor) or a material that adsorbs or reacts with volatile organic compounds, acid gas, or both. Suitable adsorbents include, for example, activated carbon, activated alumina, molecular sieves, silica gels, potassium permanganate, calcium carbonate, potassium carbonate, sodium carbonate, calcium sulfate, or mixtures thereof. In some embodiments activated alumina is blended with an activated carbon. In embodiments where the cavity has multiple chambers, a first adsorbent can be placed in the first chamber, and a second, different adsorbent can be placed in the second chamber.

The adsorbent 106 can have a variety of structures, not limited to beads, particles, tablets, and the like. The adsorbent 106 can have substantially unbonded constituents or the constituents can be bonded with a binder to itself or another material such as a support scrim. The adsorbent 106 is configured to be placed into the cavity 110 of inner body 108. The cavity 110 and the adsorbent 106 are sized such that the adsorbent 106 fits entirely within the cavity 110.

The adsorbent 106 can be unbonded to both the inner body 108 and the first filter media 104. The filter assembly 100 can lack adhesive between the adsorbent 106 and the first filter media 104. The filter assembly 100 can lack adhesive between the adsorbent 106 and the inner body 108. Omitting adhesive from the cavity 110 may advantageously allow the cavity 110 to accommodate more adsorbent compared to examples where adhesive is disposed in the cavity 110. Omitting adhesive from the adsorbent 106 may advantageously maximize the surface area of the adsorbent that is available for filtration. Omitting adhesive may advantageously reduce or eliminate off-gassing that may otherwise occur with some types of adhesives. In other exemplary embodiments, adhesive can be used to bond the adsorbent 106 to the inner body 108. Adhesive may advantageously retain the adsorbent 106 and reduce particulate escape from the adsorbent 106, for example.

In various implementations, insertion of the adsorbent 106 into the cavity 110 during manufacturing processes may result in loose particles being released from the adsorbent 106 and settling in and around the inner body 108. The first filter media 104, as discussed above, may advantageously contain such loose particles that may settle within the cavity 110, and on the perimetric surface 112. In various embodiments, the outer body 102 is generally configured to retain such loose particles from the adsorbent 106 such that such particles do not escape to the outside environment. Such a configuration may advantageously prevent loose particles that have settled on portions of the outer surface 113 of the inner body 108 from being released into the operating environment of the filter assembly 100. As described above, the first filter media 104 can be coupled to the perimetric surface 112, and in some embodiments, the first filter media 104 includes a perimeter region 115 and the perimeter region 115 can be coupled to the perimetric surface 112. In such embodiments, the first filter media 104 can also serve to contain loose particles from the adsorbent 106 which may have settled on the perimetric surface 112.

The outer body 102 generally has the second sidewall 103 and a retainer portion 114. The outer body 102 together with the inner body 108 form a portion of the housing 101. The outer body 102 includes the second sidewall 103 that is positioned laterally outward from the first sidewall 109. The outer body 102 thus surrounds the first sidewall 109. The materials used to construct the outer body 102 and material properties of the outer body 102 are generally consistent with the description above with respect to the housing 101.

The second sidewall 103 spans at least 50% of the axial length L of the first sidewall 109. The outer body 102 has a first axial end 102a and a second axial end 102b. The first axial end 102a is located at an end relatively distal to the base 107 of the inner body 108. The second axial end 102b is located at an end relatively proximal to the base 107 of the inner body 108. The second axial end 102b can abut the base 107 of the inner body 108 in some embodiments, although other configurations are possible, which will be discussed below. The second sidewall 103 can extend axially towards the base 107 to the proximal end of the base 107, where "proximal end of the base" is defined as the exterior lateral surface of the base 107, such that the second sidewall 103 laterally surrounds the first sidewall 109 and the base 107. In some such embodiments, the second sidewall 103 is positioned laterally outward from the first sidewall 109 and the base 107. The base may include a lip 117, and in some such embodiments, the second sidewall 103 is positioned laterally outward from the first sidewall 109, the base 107, and the lip 117. Such a configuration is depicted in FIG. 2B, which is otherwise consistent with FIG. 2A except that the second sidewall 103 has a proximal end 102b that has a lateral extension 105a that abuts the lateral surface of the lip 117 and an axial extension 105b that abuts the outer axial surface of the base 107 (which, in this embodiment is also the outer axial surface of the lip 117). Returning to FIGS. 1 and 2A, in filter assembly 100, where the outer body 102 is a separate, discrete component from the inner body 108, the outer body 102 can be placed over the inner body 108 during an assembly process.

The inner body 108 and the outer body 102 are generally coupled to prevent the release of loose particles that are retained between the inner body 108 and the outer body 102. Such a configuration may advantageously keep the outer surfaces of the filter assembly 100 relatively clean and prevents particulates from releasing into the electronics enclosure that the filter assembly 100 is located in. In example embodiments, the inner body 108 can be coupled to the outer body 102 by, for example, bonding an inner surface of the outer body 102 to an outer surface 113 of the inner body 108 around the perimeter of the inner body 108.

The outer body 102 and the inner body 108 can be coupled using various methods as known to a person of ordinary skill in the art. In example embodiments, the second sidewall 103 can be a coating on the first filter media 104 and the inner body 108. In other example embodiments, the second sidewall 103 creates an interference fit with the first sidewall 109. In other example embodiments, the outer body 102 creates a snap fit with the inner body 108. In other example embodiments, the second sidewall 103 and the first sidewall 109 are coupled with adhesive, welds such as ultrasonic welds or heat welds, and the like. In example embodiments, an adhesive layer can be coupled to the lip 117 of the base 107 such that the second axial end 102b of the outer body 102 adheres to the adhesive layer of the base 107. Welding of the outer body 102 and the inner body 108 can include welds which can be located at any point(s) where the outer body 102 and the inner body 108 are abutting or adjacent and accessible to be welded. This can occur along the axial length L of the first sidewall 109, on the base 107, along the retainer portion 114, or at any other locations. Further, the bonding between the outer body 102 and the inner body 108 can be continuous around the inner body 108. This can advantageously eliminate possible unbonded and open pathways which can allow for particulate escape into the outer environment. In some other embodiments, such bonds can be at discrete points along the inner body 108, for example. In some embodiments the first sidewall 109 and the second sidewall 103 are coupled through an overmolding process, described below with reference to other examples. Other methods of coupling the inner body 108/first sidewall 109 and the outer body 102/second sidewall 103 known to a person of ordinary skill in the art can be used.

As discussed above, the second sidewall 103 is generally configured to retain particulates between the first sidewall 109 and the second sidewall 103. Such a configuration may advantageously prevent such particulate matter from escaping to the outside environment. In exemplary embodiments where the filter assembly 100 is inserted into an electronics enclosure, the second sidewall 103 may advantageously protect the critical components of the electronics from such particulates. Generally, the second sidewall 103 retains or covers at least a portion of the outer surface 113 of the first sidewall 109. In exemplary embodiments, the second sidewall 103 completely surrounds the first sidewall 109.

In example embodiments, the second sidewall 103 can span at least 50% of the axial length L of the first sidewall 109. In other example embodiments, the second sidewall 103 can span at least 25% of the axial length L of the first sidewall 109. In other example embodiments, the second sidewall 103 can span at least 15% of the axial length L of the first sidewall 109. In other example embodiments, the second sidewall 103 can span at least 60%, 70%, or 75% of the axial length L of the first sidewall 109. In other example embodiments, the second sidewall 103 can span at least 80% of the axial length L of the first sidewall 109. In other example embodiments, the second sidewall 103 can span at least 85%, 90%, or 95% of the axial length L of the first sidewall 109. The second sidewall 103 can span 100% of the axial length L of the first sidewall 109 such that the second sidewall 103 spans the outer surface 113 of the first sidewall 109, the lip 117 (FIG. 1), and the base 107, as described above.

As has been described above, the first filter media 104 can be a fibrous or nonfibrous filter material with or without a supportive scrim layer. Over time, the first filter media 104 may degrade which may cause particulate shedding or loosening fibers to protrude outward from the first filter media 104, particularly around the perimeter region 115 of the first filter media 104. The outer body, and particularly the second sidewall 103 and the retainer portion 114, may advantageously retain particulates from the first filter media 104 from escaping to the outside environment.

The outer body 102 has a retainer portion 114 positioned axially outward from the first filter media 104. In some embodiments, the retainer portion 114 is generally configured to retain the first filter media 104 on the inner body 108. The retainer portion 114 extends laterally inward from the first axial end 102a of the second sidewall 103. In some embodiments, the retainer portion 114 can retain the first filter media 104, which in turn can retain the adsorbent 106 within the inner body 108. Retainer portion can define a central opening 111 to allow for diffusive fluid communication between the cavity 110 and the environment of the electronics enclosure through the first filter media 104. In example embodiments, retainer portion 114 can extend laterally inward such that the central opening 111 has a cross-dimension (such as a diameter or diagonal), for example, less than or equal to 25 mm, less than or equal to 10 mm, or less than or equal to 15 mm. In some example embodiments, the central opening 111 has a cross-dimension, for example, of greater than or equal to 5 mm, greater than or equal to 10 mm, or greater than or equal to 15 mm. In example embodiments, the central opening 111 has a flow area, for example, of less than or equal to 800 mm$^2$ (square millimeters), less than or equal to 400 mm$^2$, or less than or equal to 200 mm$^2$. In example embodiments, the central opening 111 has a flow area of, for example, greater than or equal to 20 mm$^2$, greater than or equal to 50 mm$^2$, or greater than or equal to 100 mm$^2$.

In some embodiments, including that depicted, the retainer portion 114 can include an inner rim 116 which extends laterally across at least a portion of the perimetric surface 112. In some embodiments, including that depicted, the retainer portion 114 extends laterally across the entire perimetric surface 112. The inner rim 116 can extend 2 mm to 6 mm laterally inward from the second sidewall 103. In some embodiments the inner rim 116 extends no more than 5 mm, 4 mm, or 3 mm laterally inward beyond the inner boundary of the perimetric surface 112. The perimeter region 115 of the first filter media 104 can be positioned axially between the retainer portion 114 and the perimetric surface 112. In some embodiments, the retainer portion 114 and inner rim 116 can compress the perimeter region 115 of the first filter media 104. This may advantageously retain the position of the first filter media 104. The inner rim 116 can define the central opening 111.

In some embodiments, the first filter media 104 can be bonded to the retainer portion 114 such that the first filter media 104 extends across the central opening 111. The first filter media 104 can be coupled to the retainer portion 114, or to the perimetric surface 112, or to both the retainer portion 114 and the perimetric surface 112, for example. The first filter media 104 and the retainer portion 114 can be coupled with adhesive, welds such as ultrasonic welds or heat welds, and the like. In some embodiments the retainer portion 114 and the first filter media 104 are coupled through an overmolding process.

The first filter media 104 can be spaced axially outward away from adsorbent 106 and create a headspace. In other example embodiments (not shown), the first filter media 104 can abut the adsorbent 106.

In some embodiments, the filter assembly 100 can be coupled or mounted to an electronics enclosure. Coupling the filter assembly 100 to the electronics enclosure can include making contact between an adhesive layer coupled to an outer surface of the base 107 and the electronics enclosure.

During manufacturing and assembly of the filter assembly 100, various techniques may be used to clean components of the filter assembly 100 in an effort to remove particulates and provide a relatively "clean" filter assembly 100 for installation into an electronics enclosure. Such cleaning techniques can include spray washing or air purging, for example. Various cleaning or washing techniques can be used to remove at least a portion of particulates that have settled on the exterior surfaces of the components that are assembled to form the filter assembly 100. For example, during manufacturing and assembly, cleaning may occur before the filter assembly 100 is fully manufactured. Further, for example, the exterior of inner body 108 may be cleaned during manufacturing, and then the exterior of the outer body 102 may be cleaned at a later step.

Figure 3:
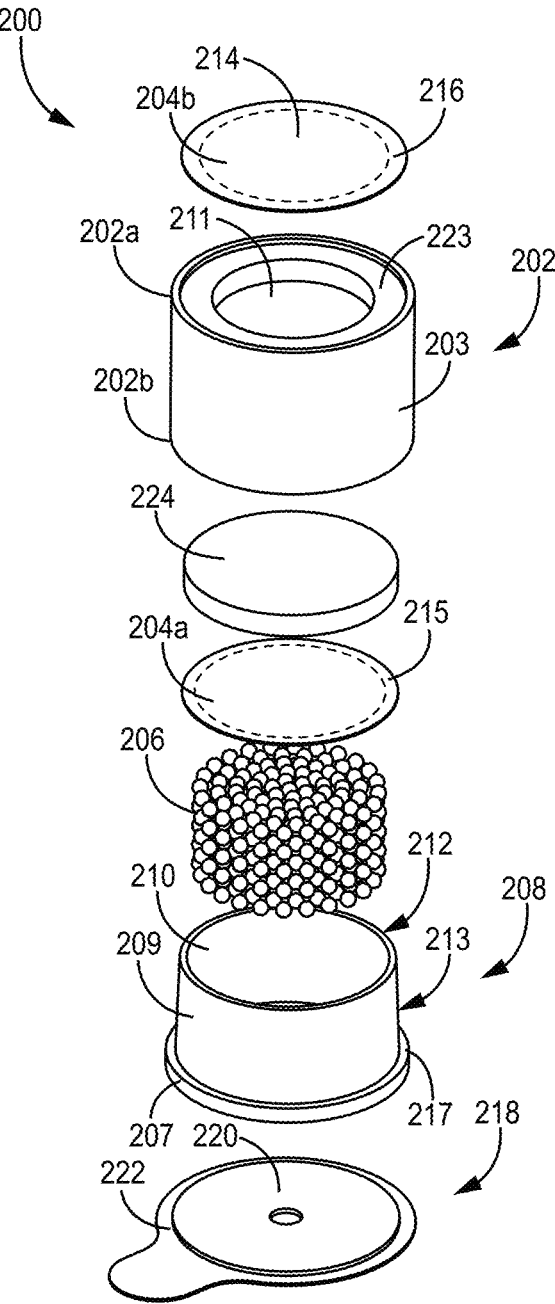
FIG. 3 is an exploded perspective view of an example adsorbent filter assembly consistent with various embodiments.
Figure 4:
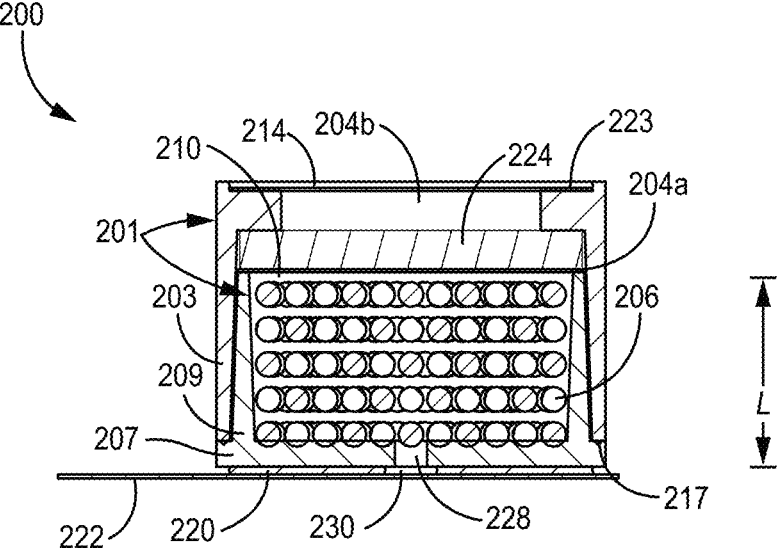
FIG. 4 is one example cross-sectional view consistent with the example of FIG. 3.

Filter assemblies consistent with the technology disclosed herein can have a variety of different configurations, and FIGS. 3 and 4 depict another such configuration. FIG. 3 depicts one example exploded view of an example filter assembly 200 and FIG. 4 depicts a cross-sectional view of the filter assembly 200 of FIG. 3. Each reference number of the present embodiments which may correspond to a similar reference number of the embodiments of FIGS. 1-2 also corresponds to a similar element. For example, first filter media 104 and first filter media 204a. Differences between the exemplary embodiments will be discussed below.

The filter assembly 200 is configured to be disposed in an electronics enclosure. The filter assembly 200 is generally configured to remove humidity and other chemical contaminants from the electronics enclosure. The filter assembly 200 is disclosed that has an inner body 208, a cover 218, an outer body 202, a first filter media 204a, and an adsorbent 206.

The housing and each component thereof are discussed below, and any material or material properties discussed in terms of the housing 201 may apply to the components of the housing 201, such as the inner body 208 and the outer body 202. In some embodiments, the housing 201 is constructed of a material that is impermeable to air flow therethrough, as discussed with respect to FIGS. 1-2.

As illustrated in FIGS. 3-4, the shape of the filter assembly 200 is a cylindrical shape. Further, a base 207 defines one or more openings configured for use either during manufacturing and/or for installation of the filter assembly 200 within its intended operating environment.

The housing 201 can have a variety of configurations while remaining consistent with the technology disclosed herein. In the current example embodiment, the housing 201 defines a portion of the cylinder defining a cavity 210. In some other embodiments, the housing 201 can define alternate shapes, however (e.g., a partial sphere, cube, cuboid, prismatic, pyramidal, cone, etc.). In some embodiments, such as the one currently depicted, the housing 201 defines more than one opening that accommodates fluid communication between the outside environment (for example, a disk drive enclosure) and the cavity 210. In various other embodiments, the housing 201 can define only one opening that accommodate fluid communication between the outside environment and the cavity 210.

The housing 201 can be constructed of a variety of materials and combinations of materials while remaining consistent with the technology disclosed herein, as discussed above with respect to FIGS. 1-2.

The housing 201 includes the inner body 208, the cover 218, and the outer body 202. Inner body 208 has a first sidewall 209. Outer body 202 has a second sidewall 203. The cover 218 can be coupled to the base 207 to either temporarily or permanently seal the one or more openings. In some embodiments, the cover 218 has an adhesive layer coupled thereto. In more specific embodiments as illustrated in FIGS. 3-4, the cover 218 has a double-sided adhesive layer 220 and a release liner 222. The double-sided adhesive layer 220 is configured to bond the filter assembly 200 to the operating environment. The release liner 222 is configured to be removed from the double-sided adhesive layer 220 prior to mounting of the filter assembly within the intended operating environment.

The inner body 208 has a first sidewall 209 with a perimetric surface 212. The inner body 208 can include the base 207 extending in a lateral direction. The inner body 208 can further include a first sidewall 209 extending axially outward in an axial direction from the base 207 by an axial length, L, where possible axial lengths can be consistent with the discussion above. The lateral direction can be transverse to the axial direction. The inner body 208 can define the cavity 210 bounded by the first sidewall 209 and the base 207. The first sidewall 209 can define the perimetric surface 212 around the cavity 210.

In exemplary embodiments, the base 207 can define a at least one diffusion channel 228. The at least one diffusion channel 228 can extend through the base 207 and create a through-hole. The at least one diffusion channel 228 can allow air, vapor, or other material, for example, to diffuse through into the cavity 210. The diffusion channel 228 thus allows for fluid communication between the outside environment and the filter, as described above. In such embodiments, the double-sided adhesive layer 220 can define at least one breather port 230. The at least one breather port 230 can align with the at least one diffusion channel 228 to allow the fluid communication described above. The at least one breather port 230 can abut the at least one diffusion channel 228. The release liner 222, discussed above, can extend across the breather port 230 to seal the breather port 230 until the filter assembly 200 is installed in the electronics enclosure.

The perimetric surface 212 is generally configured to be coupled to the first filter media 204a such that the first filter media 204a extends across the cavity 210. The perimetric surface 212 can be transverse to the axial direction. The perimetric surface 212 can surround the cavity 210. The perimetric surface 212 can be located at an end relatively distal to the base 207 of the inner body 208.

In some embodiments, such as the one currently depicted, the inner body 208 can include a single chamber or multiple chambers within the cavity 210, as discussed above with respect to FIGS. 1-2.

The housing 201 (and in example embodiments, more specifically the inner body 208) and the first filter media 204a mutually define the cavity 210 between them. The first filter media 204a abuts the cavity 210 to allow fluid communication between the cavity 210 and the environment external to the filter assembly 200. In some embodiments, the first filter media 204a can be coupled to the inner body 208. The first filter media 204a can be coupled to the perimetric surface 212. In some embodiments, the first filter media 204a includes a perimeter region 215, which can be coupled to the perimetric surface 212. The first filter media 204a and the perimetric surface 212 can be coupled with adhesive, welds such as ultrasonic welds or heat welds, and the like.

The first filter media 204a is configured to accommodate fluid flow therethrough including water vapor and chemical contaminants. The first filter media 204a can be a variety of different materials and combinations of materials, as discussed above with respect to FIGS. 1-2.

The cavity 210 is configured to receive the adsorbent 206. The first filter media 204a is coupled to the inner body 208 across the cavity 210 to isolate the cavity, and therefore the adsorbent 206, from the environment outside of the filter assembly 200.

The adsorbent 206 is generally configured to adsorb chemical contaminants from the cavity 210. The adsorbent 206 is disposed between the first filter media 204a and the inner body 208. In example embodiments, the adsorbent 206 is generally configured to adsorb chemical contaminants from the outside environment which flow into the cavity 210. The adsorbent 206 can be a material as described above with respect to FIGS. 1-2. In some particular embodiments, the adsorbent 206 is silica gel or a molecular sieve. In embodiments where the cavity 210 has multiple chambers, a first adsorbent can be placed in the first chamber, and a second, different adsorbent can be placed in the second chamber.

The adsorbent 206 can have a variety of structures, not limited to beads, particles, tablets, and the like. In exemplary embodiments as illustrated in FIGS. 3-4, the adsorbent 206 is in a bead structure. The adsorbent 206 is configured to be placed into the cavity 210 of inner body 208. The cavity 210 and the adsorbent 206 are sized such that the adsorbent 206 fits entirely within the cavity 210.

The adsorbent 206 can be unbonded to both the inner body 208 and the first filter media 204a. The filter assembly 200 can lack adhesive between the adsorbent 206 and the first filter media 204a. In other exemplary embodiments, adhesive can be used to bond the adsorbent 206 to the inner body 208. Such possible use of adhesive and possible advantages and disadvantage are discussed above with respect to FIGS. 1-2.

Similar to the description of FIGS. 1-2, above, the outer body 202 is generally configured to retain loose particles originating from the adsorbent 206 that have settled on portions of an outer surface 213 of the first sidewall 209 of the inner body 208 during the manufacturing process, such that such particles do not escape to the outside environment. As described above, the first filter media 204a can be coupled to the perimetric surface 212, and in some embodiments, the first filter media 204a includes a perimeter region 215 and the perimeter region 215 can be coupled to the perimetric surface 212. In such embodiments, the first filter media 204a can also serve to contain loose particles from the adsorbent 206 which may have settled on the perimetric surface 212.

The outer body 202 generally has the second sidewall 203. The outer body 202 together with the inner body 208 form a portion of the housing 201. The outer body 202 includes the second sidewall 203 that is positioned laterally outward from the first sidewall 209. The outer body 202 thus surrounds the first sidewall 209. In alternative embodiments, the second sidewall 203 can extend axially towards the base 207 to the proximal end of the base 207, such that the second sidewall 203 laterally surrounds the first sidewall 209 and the base 207. In some such embodiments, the second sidewall 203 is positioned laterally outward from the first sidewall 209 and the base 207. The base may include a lip 217, and in some such embodiments, the second sidewall 203 is positioned laterally outward from the first sidewall 209, the base 207, and the lip 217. The materials and material properties of the second sidewall 203 are generally consistent with the description above with respect to the housing 201, in some embodiments.

The second sidewall 203 can define an inner rim 223. The inner rim 223 is generally configured to be coupled to a second filter media 204b such that the second filter media 204b extends across the central opening 211. The inner rim 223 can extend transversely to the axial direction. In some embodiments, the second filter media 204b includes a second perimeter region 216, which can be coupled to the inner rim 223 via adhesive, a weld, or the like. The inner rim 223 can surround the central opening 211. The inner rim 223 can be located at or towards the distal end of the second sidewall 203. Unlike the previous example, in the current example the inner rim is slightly inset from the distal end of the outer body 203. The inner rim 223 extends laterally inward to define the central opening 211 that can have dimensions consistent with the discussions of inner rims disclosed above. In some embodiments, the second perimeter region 216 of the second filter media 204b can be positioned on an outer surface of the inner rim 223. In some other embodiments, the second perimeter region 216 of the second filter media 204b can be positioned on an inner surface of the inner rim 223.

The outer body 202 has the second sidewall 203 which spans at least 50% of the axial length L of the first sidewall 209. The outer body 202 has a first axial end 202a and a second axial end 202b. The first axial end 202a is located at an end relatively distal to the base 207 of the inner body 208. The second axial end 202b is located at an end relatively proximal to the base 207 of the inner body 208. The second axial end 202b can abut the base 207 of the inner body 208 in some embodiments, although other configurations are possible, which will be discussed below. In filter assembly 200, where the outer body 202 is a separate, discrete component from the inner body 208, the outer body 202 can be placed over the inner body 208 during an assembly process.

The inner body 208 and the outer body 202 are generally coupled to prevent the release of loose particles that are retained between the inner body 208 and the outer body 202. In example embodiments, the inner body 208 can be coupled to the outer body 202 by, for example, bonding an inner surface of the outer body 202 to an outer surface of the inner body 208 around the perimeter of the inner body 208. In another example, the second axial end 202b of second sidewall 203 is bonded to the base 207. In example embodiments, an adhesive layer can be coupled to the lip 217 of the base 207 such that the second axial end 202b of the outer body 202 adheres to the adhesive layer of the base 207. The outer body 202 and the inner body 208 can be coupled using various methods as known to a person of ordinary skill in the art and as discussed above with respect to FIGS. 1-2.

Also, as discussed above, the second sidewall 203 is generally configured to retain particulates between the first sidewall and the second sidewall. Generally, the second sidewall 203 retains or covers at least a portion of the outer surface 213 of the first sidewall 209. In exemplary embodiments, the second sidewall 203 completely surrounds the first sidewall 209. In example embodiments, the second sidewall 203 can span at least 50% of the axial length L of the first sidewall 209, but the second sidewall 203 can span other axial lengths of the first sidewall 209 as discussed above. In the current example, the second sidewall 203 spans 85% to 100% of the axial length L of the first sidewall 209.

In the current example, the outer body has a retainer portion 214 that has an alternate structure to the retainer portion described above with respect to FIGS. 1 and 2. More particularly, in the current example, the retainer portion 214 is the second filter media 204*b* and the inner rim 223. In alternative embodiments, the retainer portion 214 is the inner rim 223 alone. The outer body, and particularly the second sidewall 203 and the inner rim 223, may advantageously retain particulates shed from the first filter media 204*a* and the adsorbent 206 from escaping to the outside environment.

Retainer portion 214 can be positioned axially outward from the first filter media 204*a*. In some embodiments, the retainer portion 214 is generally configured to retain particulates within the outer body 202. The retainer portion 214 extends laterally inward from the first axial end 202*a* of the second sidewall 203. Retainer portion 214 can allow for diffusive fluid communication between the cavity 210 and the environment of the electronics enclosure through the second filter media 204*b*. As stated above, here the retainer portion includes the second filter media 204*b*. The second filter media 204*b* can be coupled to the second sidewall 203 and can extend across a central opening 211. More particularly, the second filter media 204*b* is coupled to the inner rim 223. The inner rim 223 is a ledge defined by the first axial end 202*a* of the second sidewall 203. Second filter media 204*b* can be bonded to the second sidewall 203, and more particularly to the inner rim 223 of the outer body 202 with adhesive, welds such as ultrasonic welds or heat welds, and the like, as described above.

In some embodiments, the second filter media 204*b* includes the second perimeter region 216, which can be coupled to the inner rim 223, as described above. The second filter media 204*b* can be a variety of different materials and combinations of materials, as discussed above with respect to the first filter media 104 of FIGS. 1-2.

The filter assembly 200 has a second adsorbent 224. The second adsorbent 224 is generally configured to adsorb chemical contaminants. The second adsorbent 224 can be a material that is less likely to shed hard particles than the first adsorbent (e.g., an activated carbon tablet). The second adsorbent 224 thus may be less likely to produce particulate which may escape the filter and cause damage to other components in the electronics enclosure. In alternative embodiments, the second adsorbent 224 can be a material as described above with respect to the adsorbent 106 and 206 of FIGS. 1-4.

The second adsorbent 224 can have a variety of structures, not limited to beads, particles, tablets, and the like, similar to the discussions above relative to the first adsorbent. The structure of the second adsorbent 224 can include one or more structures which promotes airflow between the first filter media 204*a* and the second filter media 204*b*. The second adsorbent 224 can be perforated, can be a beaded structure, or can include embossments, as examples. In some exemplary embodiments, the second adsorbent 224 can include through-holes to allow for fluid communication between the first filter media 204*a* and the second filter media 204*b*.

In exemplary embodiments as illustrated in FIGS. 3-4, the second adsorbent 224 has a tablet structure. The second adsorbent 224 is disposed between the first filter media 204*a* and the second filter media 204*b*. The second adsorbent 224 is positioned axially outward from the first filter media. The second adsorbent 224 is abutting the first filter media 204*a*. In the current example, the second adsorbent 224 is spaced in the axial direction from the second filter media 204*b*. In other embodiments the second adsorbent 224 can abut the second filter media 204*b*. The second adsorbent 224 can be unbonded or bonded relative to the first filter media 204*a* and/or the second filter media 204*b*. In some examples, the second adsorbent 224 is between the perimetric surface 212 (and, therefore, the first filter media 204*a*), and the inner rim 223. In some embodiments the second adsorbent 224 can be under compression between the perimetric surface 212 and the inner rim 223.

Figure 5:
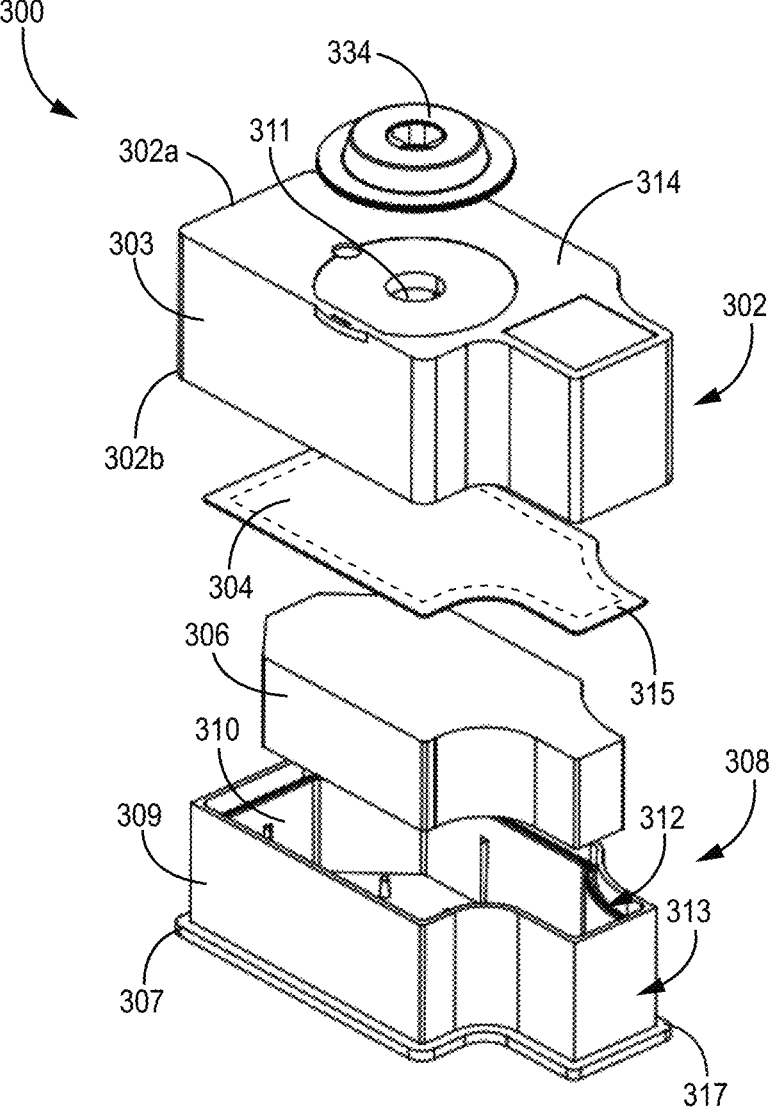
FIG. 5 is one example exploded perspective view of an example adsorbent filter assembly consistent with various embodiments.
Figure 6:
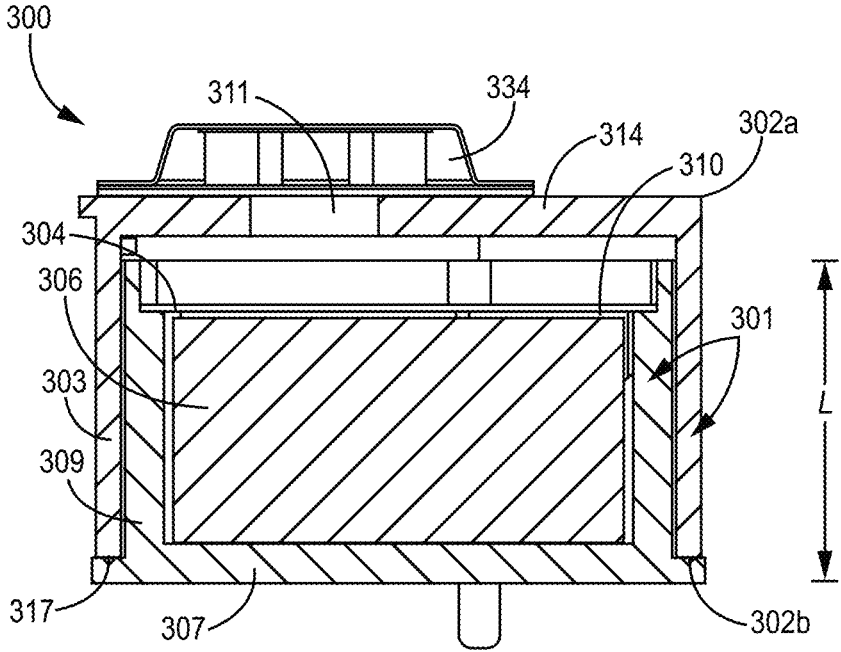
FIG. 6 is one example cross-sectional view consistent with the example of FIG. 5.

FIG. 5 depicts one example exploded view of yet another example filter assembly 300 and FIG. 6 depicts a cross-sectional view of the filter assembly 300 of FIG. 5. The filter assembly 300 is configured to be disposed in an electronics enclosure. The filter assembly 300 is generally configured to remove humidity and other chemical contaminants from the electronics enclosure. The filter assembly 300 is disclosed that has an inner body 308, an outer body 302, a first filter media 304, and an adsorbent 306.

The housing 301 can have a variety of configurations while remaining consistent with the technology disclosed herein. In the current example embodiment, the housing 301 has an irregular shape, such as an asymmetric prism defining a cavity 310. The housing 301 can define alternate shapes, that are discussed above. While the currently depicted housing 301 defines a single cavity 310, in some other embodiments the housing 301 defines two or more cavities. In some embodiments, such as the one currently depicted, the housing 301 defines an opening 311 that accommodates fluid communication between the outside environment (for example, a disk drive enclosure) and the cavity 310. In various other embodiments, the housing 301 can define more than one opening that accommodates fluid communication between the outside environment and the cavity 310.

The housing 301 includes the inner body 308 and the outer body 302. The inner body 208 and the outer body 302 can be constructed of materials discussed with respect to embodiments described above. The inner body 308 has a first sidewall 309 surrounding the cavity 310. The outer body 302 has a second sidewall 303 surrounding the cavity 310. The inner body 308 can include a base 307 extending in a lateral direction. The inner body 308 can further include the first sidewall 309 extending outward in an axial direction from the base 307 by an axial length, L, where the axial length can be consistent with the discussions above. The inner body 308 can define the cavity 310 bounded by the first sidewall 309 and the base 307.

The first sidewall 309 can have a perimetric surface 312 around the cavity 310. The perimetric surface 312 is generally configured to be coupled to a perimeter region 315 of the first filter media 304 such that the first filter media 304 extends across the cavity 310. The perimetric surface 312 can be transverse to the axial direction. The perimetric surface 312 can surround the cavity 310. Unlike embodiments discussed above, where the perimetric surface is located at the distal end of the inner body, here the perimetric surface 312 is offset from the distal end of the inner body 308. However, the perimetric surface 312 is still located towards the distal end of the inner body 308.

The housing 301 (and in example embodiments, more specifically the inner body 308) and the first filter media 304 mutually define the cavity 310 between them. The first filter media 304 abuts the cavity 310 to allow fluid communication between the cavity 310 and the environment external to the filter assembly 300. In some embodiments, the first filter media 304 can be coupled to the inner body 308. The first filter media 304 can be coupled to the perimetric surface 312. In some embodiments, the first filter media 304 includes a perimeter region 315, which can be coupled to the perimetric surface 312. The first filter media 304 and the perimetric surface 312 can be coupled with adhesive, welds such as ultrasonic welds or heat welds, and the like.

The cavity 310 is configured to receive the adsorbent 306. The first filter media 304 is coupled to the inner body 308 across the cavity 310 to isolate the cavity, and therefore the adsorbent 306, from the environment outside of the filter assembly 300. The first filter media 304 can be a variety of different materials and combinations of materials, as discussed above with respect to FIGS. 1-2. The adsorbent 306 is disposed between the first filter media 304 and the inner body 308. The adsorbent 306 can be a material as described above with respect to FIGS. 1-2. In embodiments where the cavity 310 has multiple chambers, a first adsorbent can be placed in the first chamber, and a second, different adsorbent can be placed in the second chamber. The adsorbent 306 can be configured consistently with adsorbents described in detail above.

The outer body 302 includes the second sidewall 303 that is positioned laterally outward from the first sidewall 309. The outer body 302 thus laterally surrounds a portion of the first sidewall 309. In alternative embodiments, the second sidewall 303 laterally surrounds the first sidewall 309 and the base 307. In some such embodiments, the second sidewall 303 is positioned laterally outward from the first sidewall 309 and the base 307. The base may include a lip 317 that extends laterally outward from the base, and laterally outward from the first sidewall. In some such embodiments, the second sidewall 303 is positioned laterally outward from the first sidewall 309, the base 307, and the lip 317.

The outer body 302 has a first axial end 302a and a second axial end 302b. The first axial end 302a is located at an end relatively distal to the base 307 of the inner body 308. The second axial end 302b is located at an end relatively proximal to the base 307 of the inner body 308. The second axial end 302b can abut the base 307 of the inner body 308 in some embodiments, although other configurations are possible, which will be discussed below. The inner body 308 and the outer body 302 can be coupled consistently with discussions elsewhere herein.

Generally, the second sidewall 303 retains or covers at least a portion of the outer surface 313 of the first sidewall 309. In exemplary embodiments, the second sidewall 303 completely surrounds the first sidewall 309. In example embodiments, the second sidewall 303 can span at least 50% of the axial length L of the first sidewall 309 or other ranges discussed above. In the example depicted, the second sidewall 303 spans 95% to 99% of the axial length L of the first sidewall 309. Although not illustrated, in some embodiments, the second sidewall 303 is positioned laterally outward from the first sidewall 309, the base 307, and the lip 317 such that the second sidewall 303 spans 100% of the axial length L of the first sidewall 309.

The retainer portion 314 is generally consistent with retainer portions discussed above, except for differences noted herein or visible in the figures. The retainer portion 314 is positioned axially outward from the first filter media 304. The retainer portion 314 extends laterally inward from the first axial end 302a of the second sidewall 303. Unlike some previous examples, in the current example, the retainer portion 314 is not a filter media or an inner rim like has been described in previous examples. Rather, in this example the retainer portion 314 is a laterally extending surface extending across most of the lateral area of the distal end of the cavity 310. The retainer portion 314 can extend across at least 70%, 75%, 80%, and up to 100% of the lateral area of the distal end of the cavity 310. The retainer portion 314 can be a single, cohesive component with the second sidewall 303 but in other embodiments the retainer portion 314 can be a separate component that is coupled to the second sidewall 303.

The first filter media 304 is positioned axially between the retainer portion 314 and the perimetric surface 312. More particularly, the perimeter region 315 of the first filter media 304 is positioned axially between the retainer portion 314 and the perimetric surface 312. In the current example, the filter media 304 is directly coupled to the perimetric surface 312 of the inner body 308 and is spaced in the axial direction from the retainer portion 314. In the current example, the retainer portion 314 defines the opening 311. Unlike embodiments described above, where the retainer portion defines a central opening, the present embodiment includes the opening 311 that is not necessarily central to the retainer portion 314. The retainer portion 314 allows for diffusive fluid communication between the cavity 310 and the environment of the electronics enclosure through the first filter media 304 and through the opening 311 of the outer body 302.

The currently depicted filter assembly 300 has an inlet filter 334 may operate as an additional filter between the outside environment and the disk drive, for example. The inlet filter 334 may operate as a filter during both manufacture and assembly of the filter assembly 300, and during use of the filter assembly 300 once it is placed in a disk drive. The inlet filter 334 can be in selective fluid communication with the opening 311. An example inlet filter 334 is described in U.S. Pat. No. 10,134,447 B2.

Figure 7:
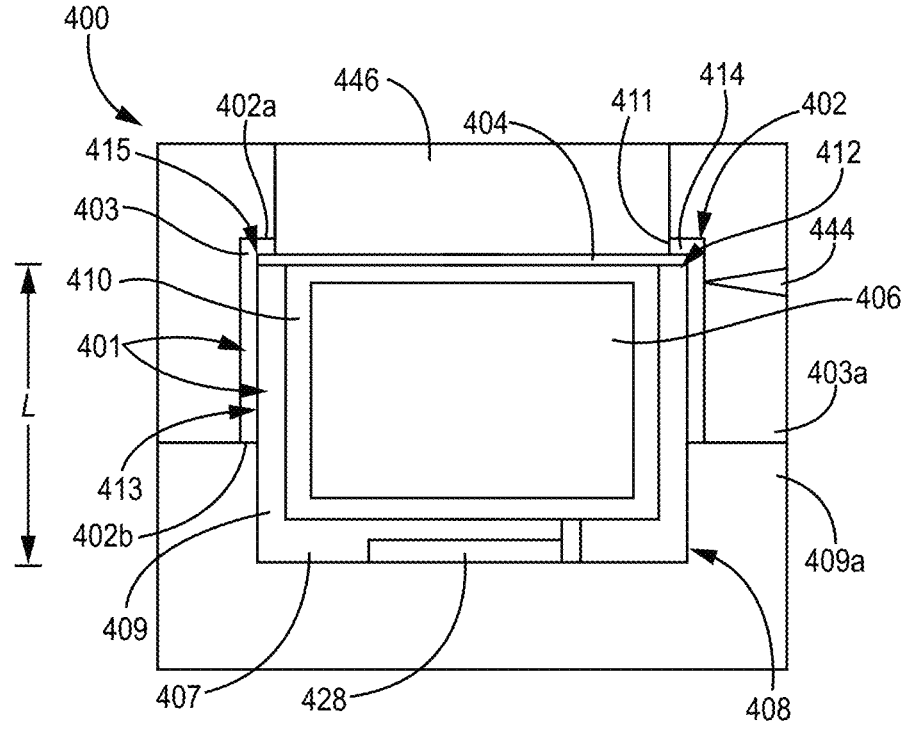
FIG. 7 is one example cross-sectional view of an example mold and adsorbent filter assembly consistent with various embodiments.

FIG. 7 depicts one example cross-sectional view of yet another example filter assembly 400 during a manufacturing step and includes a cross-sectional view of an example mold and adsorbent filter assembly consistent with various embodiments.

The filter assembly 400 is disclosed that has an inner body 408, an outer body 402, a first filter media 404, and an adsorbent 406. The housing 401 includes the inner body 408 and the outer body 402. The inner body 408 has a first sidewall 409. The outer body 402 has a second sidewall 403. The housing 401 can have a variety of configurations consistently with the current example, such as a cylindrical shape, prismatic shape, irregular shapes, or other shapes described above. The housing 401 defines a cavity 410. In this example, the housing 401 defines at least one diffusion channel 428, that accommodates fluid communication between the outside environment and the cavity 410. The housing 401 can be constructed of a variety of materials and combinations of materials while remaining consistent with the technology disclosed herein, as discussed above with respect to FIGS. 1-2.

The inner body 408 has a first sidewall 409 having a perimetric surface 412. The inner body 408 has a base 407 extending in a lateral direction. The first sidewall 409 extends axially outward from the base 407 by an axial length, L, where possible axial lengths can be consistent with the discussion above. The inner body 408 can define the cavity 410 bounded by the first sidewall 409 and the base 407. The first sidewall 409 can define the perimetric surface 412 around the cavity 410. The perimetric surface 412 surrounds the cavity 410. The perimetric surface 412 can be located at a distal end of the inner body 408. While the inner body 408 has a single chamber of the cavity 410 that is visible, in some embodiments the cavity 410 can have multiple chambers, which has been described above.

The inner body 408 and the first filter media 404 mutually define the cavity 410 between them. The first filter media 404 abuts the cavity 410 to allow fluid communication between the cavity 410 and the environment external to the filter assembly 400. The first filter media 404 is coupled to the inner body 408. The first filter media 404 has a perimeter region 415 that is coupled to the perimetric surface 412. The first filter media 404 can be a variety of different materials and combinations of materials, as discussed above.

The cavity 410 is configured to receive the adsorbent 406. The first filter media 404 is coupled to the inner body 408 across the cavity 410 to isolate the cavity, and therefore the adsorbent 406, from the environment outside of the filter assembly 400. The adsorbent 406 can be a material discussed elsewhere herein.

In the current example, the base 407 defines the at least one diffusion channel 428. The diffusion channel 428 extends through the base 407 and creates a tortuous flow path for fluid communication between the outside environment and the cavity 410. The diffusion channel 428 can allow air, vapor, or other material, for example, to move through the diffusion channel 428 and enter the cavity 410.

The outer body 402 is generally configured to retain loose particles that have settled on portions of an outer surface 413 of the first sidewall 409 of the inner body 408 such that such particles do not escape to the outside environment. The outer body 402 generally has the second sidewall 403 and a retainer portion 414. The outer body 402 includes the second sidewall 403 that is positioned laterally outward from the first sidewall 409. The outer body 402 thus surrounds at least a portion of the axial length of the first sidewall 409. In alternative embodiments, the second sidewall 403 laterally surrounds the first sidewall 409 and the base 407. In some such embodiments, the second sidewall 403 is positioned laterally outward from the first sidewall 409 and the base 407. In alternative embodiments where the base includes a lip, such as discussed above, the second sidewall 403 can be positioned laterally outward from the first sidewall 409, the base 407, and the lip, as discussed above. The materials and material properties of the second sidewall 403 are generally consistent with the descriptions above.

The outer body 402 has a first axial end 402a and a second axial end 402b. The first axial end 402a is located at the distal end of the inner body 408. The second axial end 402b is located towards the proximal end of the inner body 408.

As with embodiments described above, the second sidewall 403 retains or covers at least a portion of the outer surface 413 of the first sidewall 409. In exemplary embodiments, the second sidewall 403 completely surrounds the first sidewall 409 in the lateral direction. The second sidewall 403 spans at least 50% of the axial length L of the first sidewall 409. In other example embodiments, the second sidewall 403 can span 100% of the axial length L of the first sidewall 409. In the current example, the second sidewall 403 spans at least 60%, 70% or 80% of the axial length L of the first sidewall 409.

The outer body 402 has a retainer portion 414 positioned axially outward from the first filter media 404. In the current example, the retainer portion 414 is configured to retain the first filter media 404 on the inner body 408. The retainer portion 414 extends laterally inward from the first axial end 402a of the second sidewall 403. Retainer portion 414 can define a central opening 411 to allow for diffusive fluid communication between the cavity 410 and the environment of the electronics enclosure through the first filter media 404. In example embodiments, retainer portion 414 can extend laterally inward as described above. The retainer portion 414 is an inner rim that extends laterally across at least a portion of the perimetric surface 412. The perimeter region 415 of the first filter media 404 is positioned axially between the retainer portion 414 and the perimetric surface 412.

In some embodiments, the first filter media 404 can be bonded to the retainer portion 414 such that the first filter media 404 extends across the central opening 411. The first filter media 404 can be coupled to the retainer portion 414, or to the perimetric surface 412, or to both the retainer portion 414 and the perimetric surface 412, for example. In the current example the retainer portion 414 and the first filter media 404 are coupled through an overmolding process. In some embodiments the first filter media 404 is also coupled to the perimetric surface 412 through an adhesive or weld, as examples.

In the current example, the second sidewall 403 is a coating on the first filter media 404 and the inner body 408 that is formed through an overmolding process. FIG. 7 further illustrates an example mold which can be used to overmold the outer body 402 onto the inner body 408. A first mold 409a and a second mold 403a are generally configured to position the inner body 408, the adsorbent 406, and the first filter media 404 for an overmolding process. The first mold 409a and the second mold 403a are generally configured to define the size, shape, and location of the outer body 402 relative to the inner body and the first filter media 404. The first mold 409a and the second mold 403a can be any material suitable for use in an overmolding process, such as metal (e.g., aluminum), for example. The first mold 409a and the second mold 403a may form any suitable mold shape for the outer body 402. A third mold 446 can also be used to position the inner body 408, the adsorbent 406, and the first filter media 404. In the current example, the third mold 446 is configured to obstruct contact between portions of the first filter media 404 and the molding material. The third mold 446 can be spring-loaded, for example. The third mold 446 may be any material suitable for use in an overmolding process, such as materials described above with respect to the first mold 409a and the second mold 403a. The third mold 446 may advantageously stabilize the first filter media 404 of the filter assembly 400 on the first sidewall 409 for an overmolding process.

A material injection site 444 can provide a pathway for uncured or unset material to be injected into the cavity/cavities formed by the first, second, and third molds (409a, 403a, and 446, respectively). This can allow the material to fill the mold cavity to form a second sidewall 403 and retainer portion 414 to ultimately form the outer body 402. The material can then cure or set to form the outer body 402 as a solid. The material used can be any material suitable for overmolding processes, such as, for example, thermoplastic materials, such as polycarbonate, polyethylene, acrylic, or resins. The material can further be any material as described above with respect to the housing 401 (e.g., the material can be impervious to fluid communication). Once the material has cured or set, the first mold 409a, the second mold 403a, and the third mold 446 can be removed, and the filter assembly 400 remains.

Figure 8:
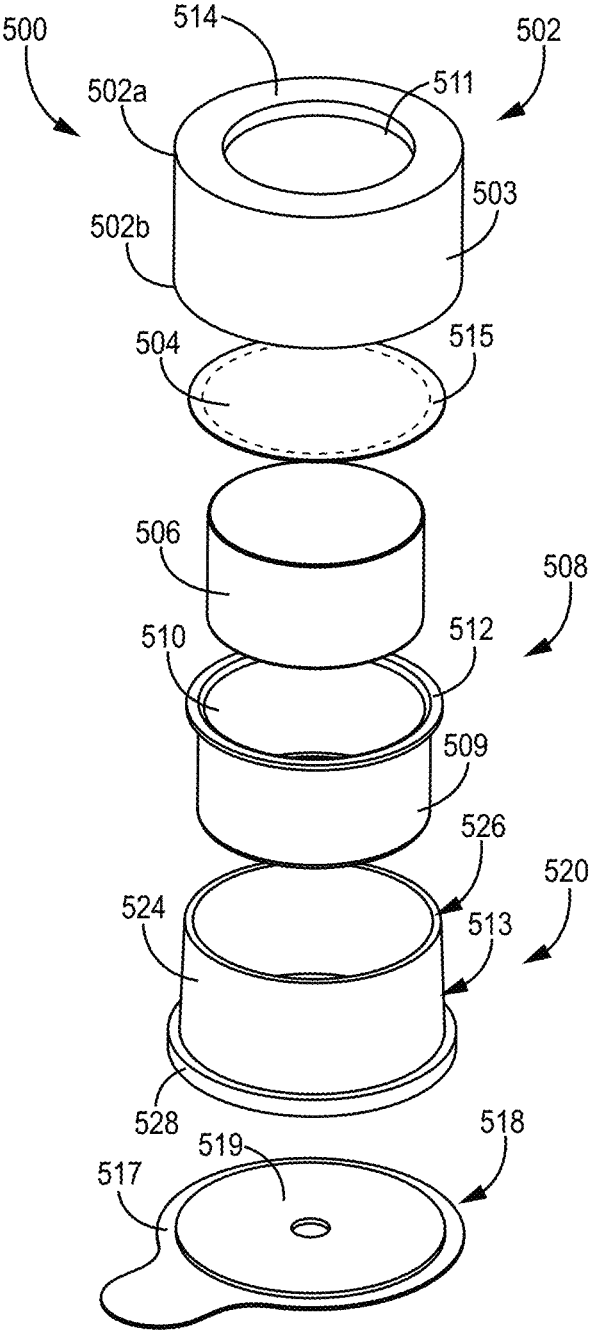
FIG. 8 is one example exploded perspective view of an example adsorbent filter assembly consistent with various embodiments.
Figure 9:
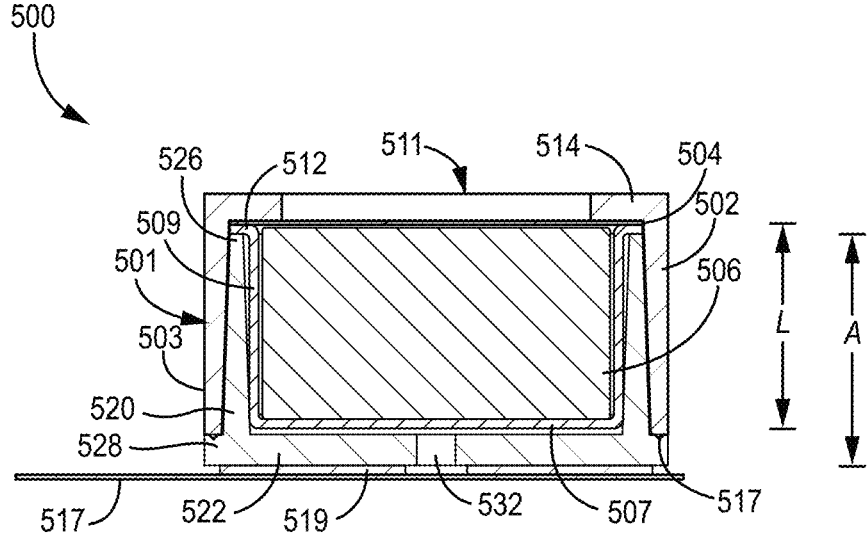
FIG. 9 is one example cross-sectional view consistent with the example of FIG. 8.

FIG. 8 depicts one example exploded view of yet another example filter assembly 500 and FIG. 9 depicts a cross-sectional view of the filter assembly 500 of FIG. 8. The filter assembly 500 is configured to be disposed in an electronics enclosure. The filter assembly 500 is generally consistent with filter assemblies described above unless particularly noted or visible in the figure. The filter assembly 500 has an inner body 508, an outer body 502, a first filter media 504, and an adsorbent 506 that are each generally consistent with descriptions above unless otherwise noted herein and/or depicted in the figures.

The housing 501 has a cavity 510 and an adsorbent 506 disposed within the cavity. The housing 501 defines a central opening 511 that accommodates fluid communication between the outside environment (for example, a disk drive enclosure) and the cavity 510. In the current example, the inner body 508 has a base 507 extending in the lateral direction and a first sidewall 509 extending axially outward from the base 507 (FIG. 9) by an axial length L. The inner body 508 defines the cavity 510 bounded by the first sidewall 509 and the base 507. In the current example the cavity 510 is a single chamber, but in some other embodiments the cavity 510 can have multiple chambers.

The first sidewall 509 defines a perimetric surface 512 around the cavity 510. The perimetric surface 512 can be transverse to the axial direction. The perimetric surface 512 is located towards the distal end of the inner body 508. Unlike some previous embodiments depicted, here the perimetric surface 512 is defined by a flange on the distal end of the first sidewall.

The first filter media 504 is coupled to the perimetric surface 512 such that the first filter media 504 extends across the cavity 510. As such, the inner body 508 and the first filter media 504 mutually define the cavity 510 between them. The first filter media 504 is coupled to the perimetric surface 512 and abuts the cavity 510. In particular, the first filter media 504 has a perimeter region 515, which is coupled to the perimetric surface 512. The first filter media 504 and the perimetric surface 512 can be coupled through approaches discussed above.

Unlike some previous embodiments, in the current embodiment the inner body 508 can be constructed of a non-rigid material such as a relatively thin film. The inner body 508 can be a flexible pouch, for example. In such an example, the perimetric surface 512 can be a melted region where the first filter media 504 and the perimetric surface 512 are heat welded or ultrasonic welded together. In such an example, where the inner body 508 is constructed of a relatively thin, flexible film, the inner body 508 can adapt to the shape of the adsorbent 506 contained therein. The adsorbent 506 can be consistent with adsorbents described above. In some implementations of the current example, the adsorbent 506 is a tablet.

The outer body 502 has a first axial end and a second axial end and the second sidewall 503. The second sidewall 503 is positioned laterally outward from the first sidewall 509. The second sidewall surrounds the first sidewall 509 and spans at least 50% of the axial length of the first sidewall 509. In the current example, the second sidewall 503 spans at least 95%, 97%, or 99% of the axial length L of the first sidewall 509. More particularly, the second sidewall 503 spans 100% of the axial length L of the first sidewall 509 such that the second sidewall 503 laterally surrounds the first sidewall 509 and the base 507. In some embodiments the base may include a lip shown in previous embodiments, and the second sidewall 503 can be positioned laterally outward from the first sidewall 509, the base 507, and the lip.

The first axial end 502a is located at a distal end of the inner body 508. The second axial end 502b is located towards the proximal end of the inner body 508. In the current example, the second axial end 502b of the outer body 502 does not abut the base 507 of the inner body 508. In filter assembly 500, where the outer body 502 is a separate, discrete component from the inner body 508, the outer body 502 can be placed over the inner body 508 during an assembly process.

The retainer portion 514 can have functionality consistent with descriptions above. The retainer portion 514 is positioned axially outward from the first filter media 504. The retainer portion 514 extends laterally inward from the first axial end 502a of the second sidewall 503. In the current example, the retainer portion 514 is an inner rim like has been described in previous examples.

The first filter media 504 is positioned axially between the retainer portion 514 and the perimetric surface 512. More particularly, the perimeter region 515 of the first filter media 504 can be positioned axially between the retainer portion 514 and the perimetric surface 512. In the current example, the filter media 504 is directly coupled to the perimetric surface of the inner body 508 and is spaced in the axial direction from the retainer portion 514. In some other embodiments, however, the retainer portion 514 can compress the perimeter region 515 of the first filter media 504.

In the current example, the filter assembly 500 has an intermediate body 520 disposed between the inner body 508 and the outer body 502. The intermediate body 520 has a laterally extending surface 522 and an intermediate sidewall 524 extending axially outward from the laterally extending surface 522. The intermediate sidewall 524 is positioned between the first sidewall 509 and the second sidewall 503 in the axial direction. The laterally extending surface 522 is positioned axially outward from the base 507 such that the base 507 is positioned axially between the adsorbent 506 and the laterally extending surface 522. The intermediate sidewall 524 has an axial length A extending from the laterally extending surface 522 to a distal end 526. The second sidewall 503 surrounds the intermediate sidewall 524 in the lateral direction, and the second sidewall 503 extends at least a portion of the axial length A of the intermediate sidewall 524, where the axial length A of the intermediate sidewall 524 includes the axial height of the laterally extending surface 522.

In the current example, the outer body 502 is directly coupled to the intermediate body 520. In particular, the second end 502b of the second sidewall 503 is welded to a laterally extending lip 528 of the intermediate body 520. The first filter media 504 is positioned axially between the retainer portion 514 and the first end 502a of the second sidewall 503. More particularly, the perimeter region 515 of the first filter media 504 is positioned axially between the retainer portion 514 and the first end 502a of the second sidewall 503. In some embodiments the retainer portion 514 and the first end 502a of the second sidewall 503 can compress the perimeter region 515 of the first filter media 504 and at least a portion of the perimetric surface 512 of the inner body 508.

In the current example, the laterally extending surface 522 defines a hole 532 for selective fluid communication between the outside environment and the cavity 510. A cover 518 is coupled to the laterally extending surface 522 to either temporarily or permanently seal the hole 532. In some embodiments, the cover 518 has an adhesive layer 519 coupled thereto, such as a double-sided adhesive layer to couple the filter assembly 500 to an enclosure. The cover 518 also has a release liner 517 configured to be removed from the double-sided adhesive layer 519 to mount the filter assembly 500 within the intended operating environment. In the current example the adhesive layer 519 mutually defines the hole 532.

Embodiments consistent with the current design can further limit the negative impact of particulates on an electronics enclosure by further containing any loose particulates on outer surfaces of the filter assembly 500. For assembly of the filter assembly 500, the adsorbent 506 can be disposed in the inner body 508, and the first filter media 504 can be coupled to the inner body 508 to define a liquid seal around the adsorbent 506. The inner body 508 can be washed with liquid or air pressure to remove at least a portion of the loose particulates that may be present on the outer surface of the inner body 508. After washing, the inner body 508 having the adsorbent 506 and the first filter media 504 can be inserted into the intermediate body 520. In some embodiments, the outer surface 513 of the intermediate body 520 can also be washed. The outer body 502 can then be disposed over the assembled inner body 508 and the intermediate body 520 and coupled to the intermediate body 520.

Figure 10:
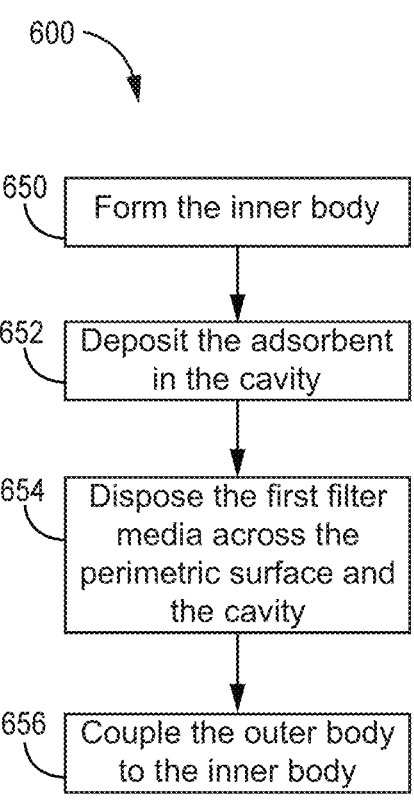
FIG. 10 is a flowchart of one example method of forming an adsorbent filter assembly consistent with various embodiments.

FIG. 10 is a flowchart of one example method of forming an adsorbent filter assembly consistent with various embodiments. The flow chart can be consistent with a method 600 used to construct filter assemblies consistent with the technology disclosed herein. A method 600 of forming a filter assembly according to exemplary embodiments can include forming an inner body 650, depositing an adsorbent in a cavity 652, disposing a first filter media across a perimetric surface and the cavity 654, and coupling an outer body to the inner body 656.

In some exemplary embodiments, forming the inner body can include forming an inner body as described above using any method generally known by a person of ordinary skill in the art. The inner body can have a base, a first sidewall, an axial length, a cavity, and a perimetric surface, as described above. Each of these features can have configurations consistent with embodiments as described above. Forming the inner body can include injection molding, machining, vacuum forming, carving, at the like. The method 600 can further include bonding the first filter media to the perimetric surface, as described above. Each of these features can have configurations consistent with embodiments as described above.

In some exemplary embodiments, depositing the adsorbent in the cavity 652 can include depositing the adsorbent in the cavity using any method generally known by a person of ordinary skill in the art. For example, adsorbent beads can be poured into the cavity. In another example, a molded adsorbent tablet can be manually or automatically positioned in the cavity. The adsorbent can be consistent with adsorbents as described elsewhere above.

Disposing the first filter media across the perimetric surface and the cavity 654 can use any method generally known by a person of ordinary skill in the art. In some embodiments the first filter media is bonded to the perimetric surface using adhesive or welds. In some embodiments the first filter media is disposed across the perimetric surface and the cavity among mold components, such as mold components in an overmolding system. The first filter media, the parametric surface, and the cavity can have configurations consistent with corresponding components described above.

Some exemplary embodiments can include an outer body, a second sidewall, a first axial end, a second axial end, a retainer portion, an inner rim, and a central opening, each of which have been described in detail above. In some exemplary embodiments, coupling the outer body to the inner body 656 can include coupling the outer body to the inner body using any method generally known to a person of ordinary skill in the art. For example, the outer body can be coupled to the inner body 656 using a weld or adhesive. The method 600 can include bonding an inner surface of the outer body to an outer surface of the inner body, as described above. The method 600 can additionally or alternatively include bonding the second axial end of the second sidewall to the base, as described above. Such bonding can include use of an adhesive layer, as described above. In some exemplary embodiments, coupling the outer body to the inner body can be performed by overmolding the second sidewall onto the first filter media and the inner body, as described above. In some such embodiments, the outer body is overmolded to the first filter media and the inner body. The method 600 can further include bonding the first filter media to the retainer portion, as described above. Each of these features can have configurations consistent with embodiments as described above.

Some exemplary embodiments can include a second filter media, as described above. The method 600 can further include depositing the second filter media across the first filter media. In such embodiments the second filter media can be coupled to the second sidewall, as described above. The second filter media can define a retainer portion of the outer body, as described above with respect to FIGS. 3-4.

STATEMENT OF THE EMBODIMENTS

Embodiment 1. A filter assembly comprising:

a housing comprising an inner body and an outer body surrounding at least a portion of the inner body, the inner body having a base extending in a lateral direction and a first sidewall extending axially outward from the base by an axial length, wherein the inner body defines a cavity and the first sidewall defines a perimetric surface around the cavity;

a first filter media extending across the perimetric surface and across the cavity; and an adsorbent disposed in the cavity, wherein the outer body comprises a second sidewall laterally outward from the first sidewall and surrounding the first sidewall, wherein the second sidewall spans at least 50% of the axial length of the first sidewall, and wherein the outer body has a first axial end and a second axial end and the outer body further comprises a retainer portion extending laterally inward from the first axial end of the second sidewall and the retainer portion is positioned axially outward from the first filter media.

Embodiment 2. The filter assembly of any one of embodiments 1 and 3-25, wherein the retainer portion comprises a second filter media coupled to the second sidewall and extending across the first filter media.

Embodiment 3. The filter assembly of any one of embodiments 1-2 and 4-25, wherein the retainer portion is an inner rim defining a central opening, wherein the inner rim extends laterally across at least a portion of the perimetric surface.

Embodiment 4. The filter assembly of any one of embodiments 1-3 and 5-25, wherein an inner surface of the outer body is bonded to an outer surface of the inner body.

Embodiment 5. The filter assembly of any one of embodiments 1-4 and 6-25, wherein the second axial end of the second sidewall is bonded to the base.

Embodiment 6. The filter assembly of any one of embodiments 1-5 and 7-25, wherein the first filter media is bonded to the perimetric surface.

Embodiment 7. The filter assembly of any one of embodiments 1-6 and 8-25, wherein the first filter media is bonded to the retainer portion.

Embodiment 8. The filter assembly of any one of embodiments 1-7 and 9-25, wherein the adsorbent comprises carbon.

Embodiment 9. The filter assembly of any one of embodiments 1-8 and 10-25, wherein the first filter media comprises a microporous membrane.

Embodiment 10. The filter assembly of any one of embodiments 1-9 and 11-25, wherein the inner body is constructed of an impermeable material.

Embodiment 11. The filter assembly of any one of embodiments 1-10 and 12-25, wherein the inner body is rigid.

Embodiment 12. The filter assembly of any one of embodiments 1-11 and 13-25, wherein the second sidewall is constructed of an impermeable material.

Embodiment 13. The filter assembly of any one of embodiments 1-12 and 14-25, wherein the second sidewall is rigid.

Embodiment 14. The filter assembly of any one of embodiments 1-13 and 15-25, wherein the second sidewall is a coating on the first filter media and the inner body.

Embodiment 15. The filter assembly of any one of embodiments 1-14 and 16-25, further comprising an adhesive layer coupled to an outer surface of the base.

Embodiment 16. The filter assembly of any one of embodiments 1-15 and 17-25, wherein the base defines a diffusion channel.

Embodiment 17. The filter assembly of any one of embodiments 1-16 and 18-25, further comprising an intermediate body disposed between the inner body and the outer body, wherein the intermediate body comprises:

a laterally extending surface wherein the base is positioned axially between the adsorbent and the laterally extending surface, and an intermediate sidewall extending axially outward from the laterally extending surface by an axial length, wherein the intermediate sidewall is positioned between the first sidewall and the second sidewall.

Embodiment 18. The filter assembly of any one of embodiments 1-17 and 19-25, wherein the inner body is non-rigid.

Embodiment 19. The filter assembly of any one of embodiments 1-18 and 20-25, wherein the intermediate body is rigid.

Embodiment 20. The filter assembly of any one of embodiments 1-19 and 21-25, wherein the second sidewall abuts the first sidewall along the length of the first sidewall.

Embodiment 21. The filter assembly of any one of embodiments 1-20 and 22-25, wherein the second sidewall spans at least 75% of the axial length of the first sidewall.

Embodiment 22. The filter assembly of any one of embodiments 1-21 and 23-25, wherein the second sidewall spans at least 85% of the axial length of the first sidewall.

Embodiment 23. The filter assembly of any one of embodiments 1-22 and 24-25, wherein the second sidewall spans at least 90% of the axial length of the first sidewall.

Embodiment 24. The filter assembly of any one of embodiments 1-23 and 25, wherein the second sidewall spans at least 95% of the axial length of the first sidewall.

Embodiment 25. The filter assembly of any one of embodiments 1-24, wherein the second sidewall spans 100% of the axial length of the first sidewall.

Embodiment 26. A method of forming a filter assembly comprising:

forming an inner body having a base that extends in a lateral direction and a first sidewall extending axially outward from the base by an axial length, wherein the base and the first sidewall define a cavity and the first sidewall has a perimetric surface around the cavity;

depositing an adsorbent in the cavity;

disposing a first filter media across the perimetric surface and the cavity; and disposing an outer body over the inner body, such that a second sidewall of the outer body is positioned laterally outward from the first sidewall and surrounds the first sidewall, wherein the second sidewall spans at least 50% of the axial length of the first sidewall, and wherein the outer body has a first axial end and a second axial end and the outer body further comprises a retainer portion extending laterally inward from the first axial end of the second sidewall and the retainer portion is positioned axially outward from the first filter media.

Embodiment 27. The method of any one of embodiments 26 and 28-50, further comprising depositing a second filter media across the first filter media and coupling the second filter media to the second sidewall to define the retainer portion.

Embodiment 28. The method of any one of embodiments 26-21 and 29-50, wherein the retainer portion is an inner rim defining a central opening, wherein the inner rim extends laterally across at least a portion of the perimetric surface.

Embodiment 29. The method of any one of embodiments 26-22 and 30-50, further comprising bonding an inner surface of the outer body to an inner surface of the inner body.

Embodiment 30. The method of any one of embodiments 26-23 and 31-50, further comprising bonding the second axial end of the second sidewall to the base.

Embodiment 31. The method of any one of embodiments 26-24 and 32-50, further comprising bonding the first filter media to the perimetric surface.

Embodiment 32. The method of any one of embodiments 26-25 and 33-50, further comprising bonding the first filter media to the retainer portion.

Embodiment 33. The method of any one of embodiments 26-26 and 34-50, wherein the adsorbent comprises carbon.

Embodiment 34. The method of any one of embodiments 26-27 and 35-50, wherein the first filter media comprises a microporous membrane.

Embodiment 35. The method of any one of embodiments 26-28 and 36-50, wherein the inner body is constructed of an impermeable material.

Embodiment 36. The method of any one of embodiments 26-29 and 37-50, wherein the inner body is rigid.

Embodiment 37. The method of any one of embodiments 26-50 and 38-50, wherein the second sidewall is constructed of an impermeable material.

Embodiment 38. The method of any one of embodiments 26-31 and 39-50, wherein the second sidewall is rigid.

Embodiment 39. The method of any one of embodiments 26-32 and 40-50, further comprising overmolding the second sidewall onto the first filter media and the inner body.

Embodiment 40. The method of any one of embodiments 26-33 and 41-50, further comprising coupling an adhesive layer to an outer surface of the base.

Embodiment 41. The method of any one of embodiments 26-34 and 42-50, wherein the base defines a diffusion channel.

Embodiment 42. The method of any one of embodiments 26-35 and 43-50, further comprising disposing the inner body in an intermediate body, wherein the intermediate body comprises:

a laterally extending surface wherein the base is positioned axially between the adsorbent and the laterally extending surface, and an intermediate sidewall extending axially outward from the laterally extending surface by an axial length, wherein the intermediate sidewall is positioned between the first sidewall and the second sidewall.

Embodiment 43. The method of any one of embodiments 26-36 and 44-50, wherein the inner body is non-rigid.

Embodiment 44. The method of any one of embodiments 26-43 and 45-50, wherein the intermediate body is rigid.

Embodiment 45. The method of any one of embodiments 26-44 and 46-50, wherein the second sidewall abuts the first sidewall along the length of the first sidewall.

Embodiment 46. The method of any one of embodiments 26-45 and 47-50, wherein the second sidewall spans at least 75% of the axial length of the first sidewall Embodiment 47. The method of any one of embodiments 26-46 and 48-50, wherein the second sidewall spans at least 85% of the axial length of the first sidewall.

Embodiment 48. The method of any one of embodiments 26-47 and 49-50, wherein the second sidewall spans at least 90% of the axial length of the first sidewall.

Embodiment 49. The method of any one of embodiments 26-48 and 50, wherein the second sidewall spans at least 95% of the axial length of the first sidewall.

Embodiment 50. The method of any one of embodiments 26-49, wherein the second sidewall spans 100% of the axial length of the first sidewall.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A filter assembly comprising:

a housing comprising an inner body and an outer body surrounding at least a portion of the inner body, the inner body having a base extending in a lateral direction and a first sidewall extending axially outward from the base by an axial length, wherein the inner body defines a cavity and the first sidewall defines a perimetric surface around the cavity;

a first filter media extending across the perimetric surface and across the cavity; and an adsorbent disposed in the cavity, wherein the outer body comprises a second sidewall laterally outward from the first sidewall and surrounding the first sidewall, wherein the second sidewall spans at least 50% of the axial length of the first sidewall, wherein the outer body has a first axial end and a second axial end and the outer body further comprises a retainer portion extending laterally inward from the first axial end of the second sidewall and the retainer portion is positioned axially outward from the first filter media; and wherein the retainer portion is an inner rim defining a central opening, wherein the inner rim extends laterally across at least a portion of the perimetric surface.

2. The filter assembly of claim 1, wherein the retainer portion comprises a second filter media coupled to the second sidewall and extending across the first filter media.

3. The filter assembly of claim 1, wherein the first filter media is bonded to the perimetric surface.

4. The filter assembly of claim 1, wherein the first filter media is bonded to the retainer portion.

5. The filter assembly of claim 1, wherein the inner body is constructed of an impermeable material.

6. The filter assembly of claim 1, wherein the inner body is rigid.

7. The filter assembly of claim 1, wherein the second sidewall is constructed of an impermeable material.

8. The filter assembly of claim 1, wherein the second sidewall is rigid.

9. The filter assembly of claim 1, wherein the second sidewall is a coating on the first filter media and the inner body.

10. The filter assembly of claim 1, wherein the base defines a diffusion channel.

11. The filter assembly of claim 1, further comprising an intermediate body disposed between the inner body and the outer body, wherein the intermediate body comprises:

a laterally extending surface wherein the base is positioned axially between the adsorbent and the laterally extending surface, and an intermediate sidewall extending axially outward from the laterally extending surface by an axial length, wherein the intermediate sidewall is positioned between the first sidewall and the second sidewall.

12. The filter assembly of claim 1, wherein the second sidewall abuts the first sidewall along the length of the first sidewall.

13. The filter assembly of claim 1, wherein the second sidewall spans at least 75% of the axial length of the first sidewall.

14. A method of forming a filter assembly comprising:

forming an inner body having a base that extends in a lateral direction and a first sidewall extending axially outward from the base by an axial length, wherein the base and the first sidewall define a cavity and the first sidewall has a perimetric surface around the cavity;

depositing an adsorbent in the cavity;

disposing a first filter media across the perimetric surface and the cavity; and disposing an outer body over the inner body, such that a second sidewall of the outer body is positioned laterally outward from the first sidewall and surrounds the first sidewall, wherein the second sidewall spans at least 50% of the axial length of the first sidewall, wherein the outer body has a first axial end and a second axial end and the outer body further comprises a retainer portion extending laterally inward from the first axial end of the second sidewall and the retainer portion is positioned axially outward from the first filter media; and wherein the retainer portion is an inner rim defining a central opening, wherein the inner rim extends laterally across at least a portion of the perimetric surface.

15. The method of claim 14, further comprising depositing a second filter media across the first filter media and coupling the second filter media to the second sidewall to define the retainer portion.

16. The method of claim 14, further comprising overmolding the second sidewall onto the first filter media and the inner body.

17. The method of claim 14, further comprising disposing the inner body in an intermediate body, wherein the intermediate body comprises:

a laterally extending surface wherein the base is positioned axially between the adsorbent and the laterally extending surface, and an intermediate sidewall extending axially outward from the laterally extending surface by an axial length, wherein the intermediate sidewall is positioned between the first sidewall and the second sidewall.

18. The method of claim 14, wherein the second sidewall spans at least 75% of the axial length of the first sidewall.

\* \* \* \* \*